Patented Mar. 11, 1930

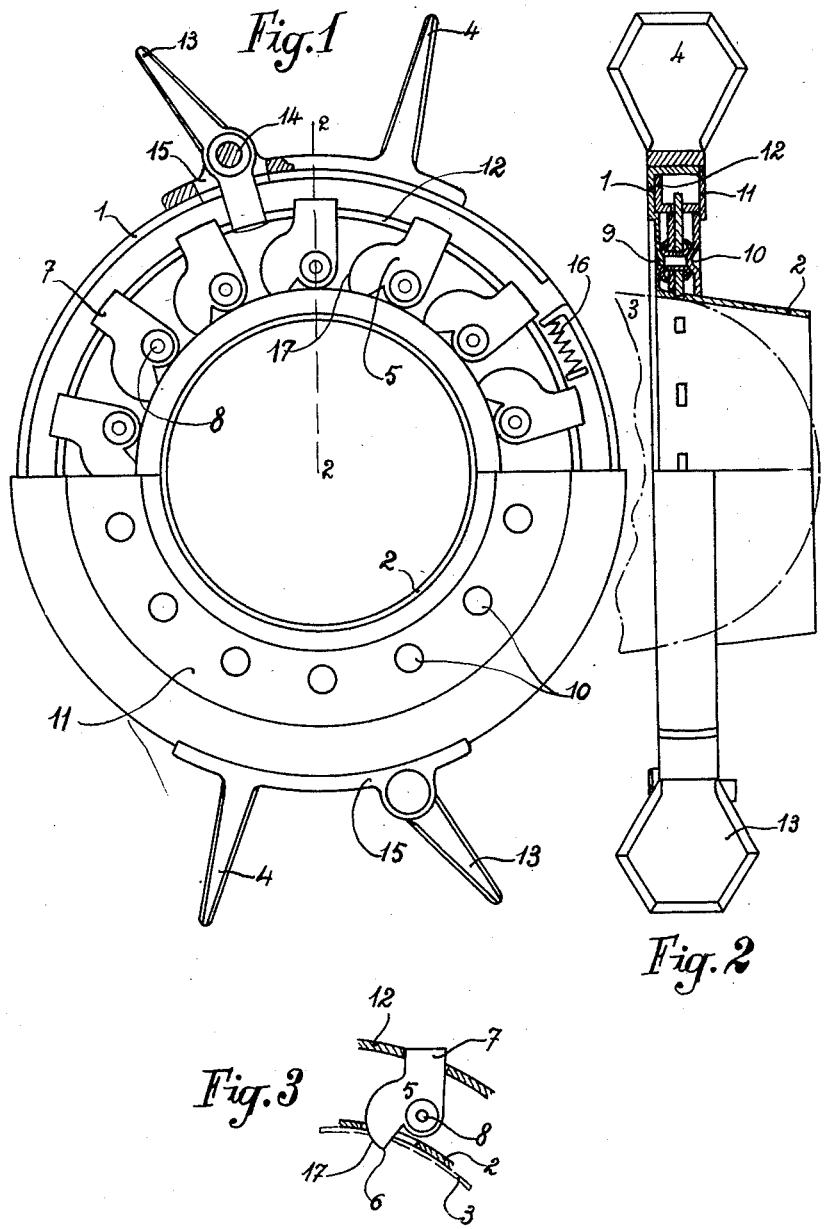

1,750,484

UNITED STATES PATENT OFFICE

PIERRE MICHELON, OF VALENCE, AND GEORGES FUGIER, OF BOURG-LES-VALENCE, FRANCE

EGG CUTTER

Application filed December 3, 1927, Serial No. 237,474, and in France December 11, 1926.

This invention relates to an egg-cutter comprising a number of pivoted cutters and an actuating mechanism driven by a small lever. It does not require the least skill for its working and does not smash the egg shell.

The annexed drawing represents an egg-cutter according to this invention:

Fig. 1 is a plan view, one half of the cover being removed.

Fig. 2 is a side view with parts in section on line 2—2 (Fig. 1).

Fig. 3 is a partial sectional view showing a cutter during working.

The apparatus comprises an annular frame 1 provided with a central frusto conical guide 2 which is to be placed on an egg 3. This frame is provided with lugs 4 for permitting an easy handling of the apparatus.

The cutters 5 comprise sharp teeth 6 and tails 7. They are each provided with a hollow shaft or pivot 8 which rotates between two conical projections 9 and 10 stamped out from the frame 1 and the annular cover 11 of the apparatus. This construction is simple and cheap.

The cutters 5 are simultaneously driven by means of a ring 12, provided with successive slots, notches or indentations in which the tails 7 are engaged. When this ring 12 is rotated, the indentations drive the tails 7 and the cutters are caused to pivot.

The ring 12 is itself driven by means of two levers 13, pivoted at 14 in bearings 15 fixed to the frame 1. The inner ends of the two levers 13 are engaged in two indentations in ring 12. A spring 16 is also provided for acting on ring 12 to bring the same to its normal position, in which the teeth 6 of the cutters do not project through the central guide 2 (Figs. 1 and 2).

In use, the guide is placed over an egg 3 (Fig. 2) and the levers 13 are pushed toward the lugs 4. Ring 12 is rotated against the action of spring 16 to drive the cutters 5; the teeth 6 project through the central guide 2 (Fig. 3), piercing the shell 3 and cutting it.

The form of cutter described, and best shown in Fig. 3, is particularly advantageous in that it does not tend to break the shell toward the interior of the egg except in the very first instant when the point 6 pierces the shell. After that first instant, the shell is cut obliquely by the straight edge of the cutter.

The apparatus is then removed and, if the levers 13 are maintained against the action of spring 16, the upper part of the egg is simultaneously removed by being held on the cutters 5.

We claim:

1. An egg cutter comprising in combination an annular frame; diametrically opposite lugs on said frame; an annular cover on said frame; a central frusto conical guide in the central aperture of said frame; internal projections on said frame and on said cover, the projections on said frame registering with those on said cover; cutters pivoted between two registering projections, each cutter comprising a hollow shaft adapted to be rotatably maintained between said registering projections, a sharp tooth arranged to project through the central aperture of said annular frame when said cutter is rotated, and an actuating tail; a ring concentric with said annular frame and rotatable thereon, said ring being provided with indentations; two pivoted levers on said frame; driving tails on said levers; and spring returning means acting on said ring; the actuating tails of said cutters and the driving tails of said levers being each engaged in an indentation of said ring, and the arrangement being such that by pushing said levers towards said lugs, said cutter teeth are caused to project through the central aperture of said frame, said spring means tending to bring said ring back to its normal position in which said teeth are withdrawn from the central aperture of said frame.

2. An egg cutter comprising a stationary annular frame; a ring disposed concentrically within the frame and rotatable thereon, said ring having a set of notches equidistantly spaced along its circumference and also having an indentation between two successive notches; fixed and pivoted handles on said frame, the pivoted handle being located opposite said indentation and having a tail engaged in the same so as to rotate the ring when said handle is pressed toward the fixed handle; and a set of cutters, one for each notch, each cutter embodying an actuating tail engaged in the corresponding notch and a sharp tooth adapted to project into the central aperture of the frame, whereby the rotation of said ring will cause all the cutters to rock simultaneously.

3. An egg cutter comprising a stationary annular frame; a ring disposed concentrically within the frame and rotatable thereon, said ring having a set of notches equidistantly spaced along its circumference and also having an indentation between two successive notches; fixed and pivoted handles on said frame, the pivoted handle being located opposite said indentation and having a tail engaged in the same so as to rotate the ring when said handle is pressed toward the fixed handle; a set of cutters, one for each notch, each cutter embodying an actuating tail engaged in the corresponding notch and a sharp tooth adapted to project into the central aperture of the frame, whereby the rotation of said ring will cause all the cutters to rock simultaneously; and a central frusto-conical guide mounted in said central aperture to be placed over an egg, said guide having a circular series of slots, one for each cutter, extending around it and wherethrough the cutter teeth are adapted to move.

4. In an egg cutter, an annular frame, a plurality of pivotally-mounted cutters disposed around the central aperture thereof; each cutter having a tooth provided with a sharp point which is adapted to pierce the shell of the egg, and also with a sharp edge which is adapted to cut the shell obliquely during the pivotal movement of the tooth; and means for operating all the cutters simultaneously.

In testimony whereof we affix our signatures.

PIERRE MICHELON.
GEORGES FUGIER.